Jan. 5, 1937. C. L. EKSERGIAN 2,066,395
BRAKE DRUM
Filed Oct. 29, 1931 2 Sheets-Sheet 1
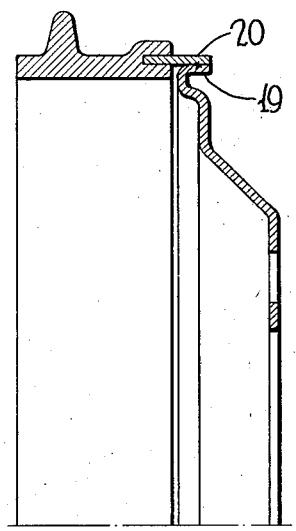
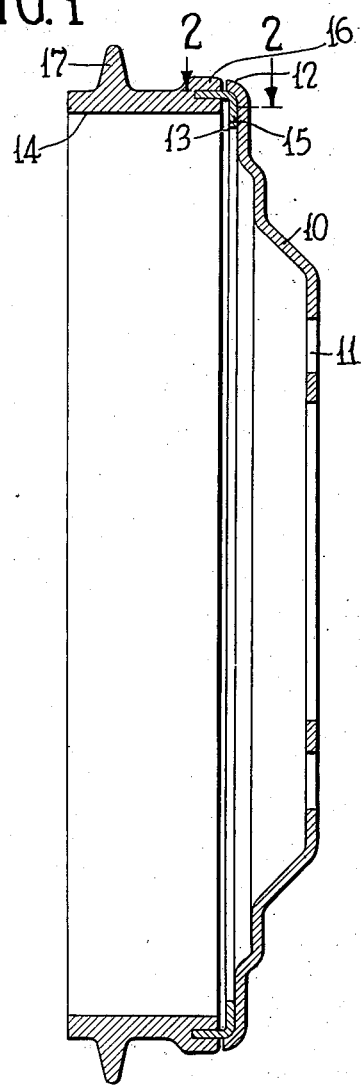
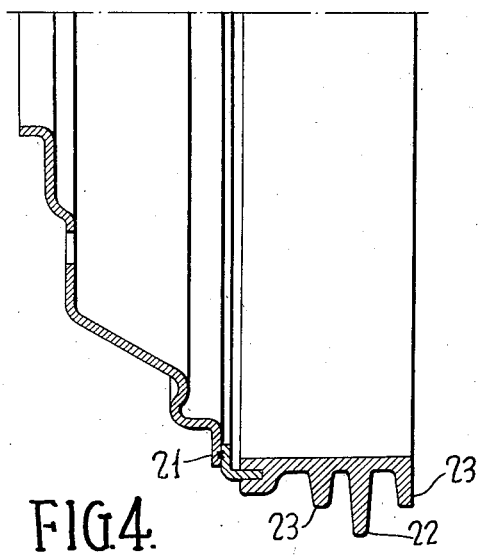
INVENTOR.
CAROLUS L. EKSERGIAN.
BY John P. Tarbox
ATTORNEY.

Jan. 5, 1937.  C. L. EKSERGIAN  2,066,395
BRAKE DRUM
Filed Oct. 29, 1931  2 Sheets-Sheet 2

INVENTOR.
Carolus L. Eksergian.
BY John P. Tarbox
ATTORNEY.

Patented Jan. 5, 1937

2,066,395

UNITED STATES PATENT OFFICE 2,066,395

BRAKE DRUM

Carolus L. Eksergian, Detroit, Mich., assignor to Budd Wheel Company, Philadelphia, Pa., a corporation of Pennsylvania Application October 29, 1931, Serial No. 571,726

12 Claims. (Cl. 188—218)

My invention relates to the art of vehicle brakes and it has been my particular object to produce a brake drum and shoe assembly capable of an adequate braking contact under substantially uniform pressure across the entire width of the available braking surface under all conditions of temperature and pressure. Such uniformity of contact has been conspicuously absent in brakes of the prior art when the drums become hot by reason of repeated applications of the brake shoes thereto. Under these conditions the phenomenon known as bell-mouthing, i. e., a conical expansion of the braking flange of the drum, has been very prevalent and has prevented the desired uniformity of contact and pressure. I have sought not only to prevent bell-mouthing, but also to avoid any serious asymmetrical expansion of the brake drum and to control whatever inequalities exist in such a manner as to avoid any deleterious effect upon the braking function.

A further object of my invention has been to design a brake shoe and drum assembly, the relative rigidity of whose axial components is such as to afford a sufficient flexibility in all points of the braking couple to avoid any untoward consequences from inequalities in the friction surface of the shoe but which is yet sufficiently rigid to avoid any considerable change from a true circular shape. Thus I have sought to devise a drum and shoe assembly which will permit of a relative yielding between these members about slight projections upon either of the friction surfaces and which will yet not permit any considerable degree of distortion of the shoe or drum in the zone of the extremities of the brake shoe upon the application of the shoe.

Further objects and advantages of my invention will be obvious from a reading of the subjoined specification in the light of the attached drawings, in which, Fig. 1 is a central axial section through my improved drum.

Fig. 2 is a section on the line 2—2 of Fig. 1.

Fig. 3 is a section of a half drum generally similar to Fig. 1 but illustrating a slight modification.

Fig. 4 is a view similar to Fig. 3 illustrating a still further modification.

Figure 5:
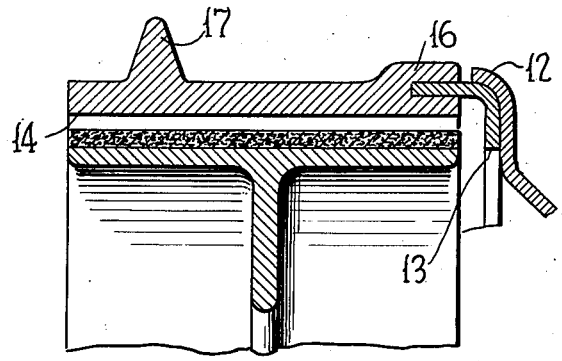
Fig. 5 is a diagrammatic sectional view illustrating the initial application of a brake shoe to my improved drum in a cold condition.

Referring to the drawings by reference characters, the numeral 10 indicates the pressed metal head of the composite drum of my invention. This head is provided with bolt receiving openings 11 through which it may be secured to a vehicle hub and with an overhanging flange 12 adapted to embrace a similar flange on an L-shaped pressed metal ring 13.

The ring 13 is integrally connected to a cast metal braking annulus 14 which constitutes the braking surface of my drum. In order to effect this integral joinder of the ring 13 and the braking annulus 14 I preferably coat the ring 13 with a suitable tinning composition and thereafter place it in a mold and integrally cast the annulus 14 around it. The outer peripheral edge of the ring 13 is also preferably formed with a plurality of dovetailed grooves 18 into which the cast metal is adapted to flow, as indicated in Fig. 2, to still further interlock these parts. In this manner I obtain a joinder between these parts of the very strongest type. The head 10 may be secured to the ring 13 in any suitable manner, but is preferably spot or spud welded thereto, as indicated at 15. A relatively wide and thick rib 16 is provided in the braking annulus 14 adjacent the outer end thereof and a tall and thin rib 17 is formed thereon in an annular zone slightly removed from the inner edge of the annulus.

The location and dimensions of this rib 17 are of great importance in the attainment of the objects of my invention, as these factors effect both the rigidity and the heat radiating qualities of the drum. I have further found that these two factors of location and rib dimension are closely interrelated so that a change in the one necessitates a corresponding change in the other in order to maintain a perfect drum. For a relatively tall and thin rib such as that illustrated in the drawings, a location of the rib approximately two-thirds of the distance from the outer to the inner edge of the braking surface has been found most satisfactory. A tall and thin rib is very much preferred to a thicker rib because of the fact that a rib of this type has a maximum radiating surface in proportion to its total heat content and is therefore able to dissipate heat by radiation at a fairly rapid rate and yet does not have such a great volume as to afford it a large heat content which would tend to maintain the temperature of the drum for a considerable length of time after the braking operation. My drum thus has rapid cooling characteristics.

My drum has been proved by actual tests both upon brake testing machines and upon roads to afford a very superior braking engagement of the shoe and drum at all normal temperatures and pressures. A few of the theoretical factors constituting the reasons for this superior performance of my drum will be apparent from a study of Figures 5 to 7 of the drawings as contrasted with the performance of a conventional pressed metal drum. It is well known that a pressed metal drum having an integral head expands into a conical shape in which its free edge has a considerably larger diameter than the edge adjacent the head of the drum, under the combined influences of heat and pressure. This conical expansion of the drum naturally decreases very considerably the effective pressure which can be obtained by the application of a substantially cylindrical shoe toward the free edge of the drum. Furthermore, the action of such a drum is different under different conditions of temperature and pressure. Accordingly, it is impossible to design a brake shoe of this type capable of correcting these factors and thus obtaining an even application of pressure. Under extreme temperatures an almost complete loss of braking power is experienced in the application of a brake shoe to such a drum. With my improved drum, on the other hand, expansion of the successive axial elements of the braking surface is very nearly equal and whatever inequalities exist do not interfere with the proper functioning of the brakes.

Figure 7:
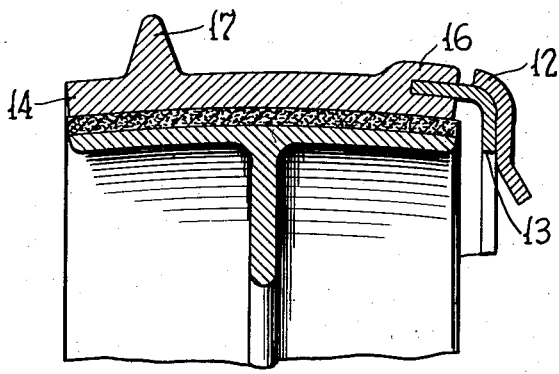
Fig. 7 is a view similar to Figures 5 and 6 illustrating the position which the parts of those figures assume upon the application of further pressure to the shoe.

Fig. 5 illustrates the initial application of a brake shoe to my drum when the drum is in a cold condition. Under these conditions both the drum and the shoe are substantially cylindrical and a fairly uniform braking contact is thus naturally obtained across the entire width of both members. The cast nature of the ring and the provision of ribs 16 and 17 thereon affords a sufficient rigidity to prevent any substantial distortion of the drum to a conical shape under the influence of the pressure of the shoe. It is to be noted, however, that the central portion of the drum is less rigid than the portions 16 and 17 and that if the drum flexes at all under these circumstances it will be the central portion which will flex outwardly to the maximum extent and that the drum will therefore assume a slightly concave shape as illustrated in Fig. 7. As the pressure upon the shoe is applied in the region of the central plane of the shoe where the shoe is most rigid, it will naturally tend to maintain its contact with the drum at this point by reason of its flexure in the zone of application of the greatest pressure. Furthermore, the force expended in flexing the shoe has its reaction in zones removed from the center, thus tending to afford an increase of pressure in zones removed from the central portion of the shoe and a corresponding decrease of pressure at the central portion thereof. As the pressure in a truly cylindrical drum is greatest in the zone of pressure application and zone of greatest rigidity of the braking couple, it will be obvious that this increase in the pressure toward the edges of the drum and decrease of effective pressure in the zone of its axial center will, if the characteristics of flexibility of the members of the braking couple are properly correlated, afford a substantially equal pressure across the entire width of the drum.

Figure 6:
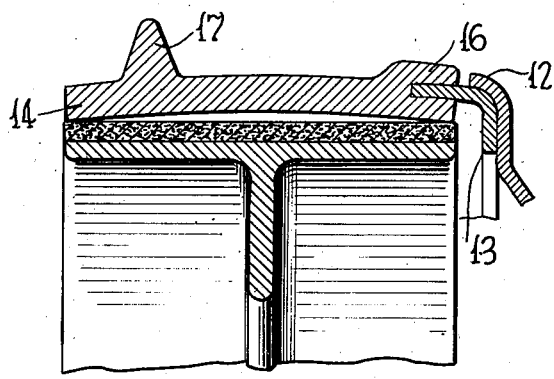
Fig. 6 is a view similar to Fig. 5 illustrating in an exaggerated manner the relative positions of the parts at the instant of initial application of the shoe after the drum has become heated.

Let us now consider the case of a hot drum as illustrated in exaggerated form in Figs. 6 and 7. The rib 17 affords provision for a considerable cooling of the free edge of this drum as does also the rib 16 on the edge of the drum adjacent the head thereof. Furthermore, both of these ribs tend to render the drum very rigid in these zones. Accordingly, any tendency of the drum to expand under the influence of heat is exaggerated to a maximum degree in the central portion of the drum and results in a transverse flexure thereof to a very slightly concave shape, as illustrated in greatly exaggerated form in Fig. 6. The application of pressure to the shoe in the central plane of the shoe and drum therefore effects an initial contact of the shoe with the extreme edges of the drum, as illustrated in Fig. 6, and thereafter causes a flexure of the shoe from these zones inwardly toward the plane of symmetry of the drum and shoe in the same manner and perhaps in slightly greater degree than in the case of a cold drum, thus effecting a complete and substantially uniform contact between the expanded drum and flexed shoe upon a moderate application of pressure to the shoe, as illustrated in Fig. 7. Such a complete contact affords an adequate application of the braking force and precludes any possibility of brake chatter.

While I have illustrated a transverse flexure of these members into complemental braking engagement with each other by a wrapping action from the edges inwardly toward the center, I wish it to be understood that my invention in its broadest aspect embraces the provision of any means whereby a symmetrical wrapping action from an initial zone of application takes place to afford a substantially complete braking contact between the shoe and drum. Thus a reverse arrangement in which application is initially had at the center of the drum and the parts are relatively flexed symmetrically in opposite directions from the center by the application of force to the edges of the brake shoes will also come within the purview of my invention.

In any case, it is highly desirable that the zone or zones of maximum rigidity of the shoe should correspond to the zone or zones of minimum rigidity of the drum. Furthermore, the shoe should preferably be applied through a force acting thereon in an axial zone corresponding to the zone of minimum rigidity of the drum.

It will be noted that my drum has been designed to afford a substantially equal expansion of the portions 16 and 17 thereof adjacent its opposite axial extremities under all conditions of heat and pressure. These parts are not only so designed as to afford a substantially equal degree of rigidity in these two zones, but are also so arranged as to cause these parts to attain substantially the same temperatures under all conditions of brake application. In an ordinary drum the free edge has a somewhat greater tendency to heat than the edge adjacent the head. In order to cause these parts to attain an equal temperature, it is therefore desirable that the free edge should be provided with better facilities for the radiation and conduction of heat than the confined edge of the drum. To this end I have designed the rib 17 of relatively tall and thin cross section in order to afford a maximum heat radiating surface and a minimum heat content. On the other hand, the rib 16 adjacent the free edge of the drum is relatively short and thick. This rib therefore has a considerable heat content because of its large volume and not so good radiating qualities because of its smaller surface area. The axially extending portion of the ring 13 also acts somewhat as a heat throttle to prevent the too rapid conduction of heat from the rib 16 to the head 10 of the drum. Thus the opposite edges of the drum are not only balanced as to rigidity by the rib 17 adjacent the free end and the rib 16 and ring 13 on the confined end of the drum, but they are also so designed as to attain substantially equal mean effective temperatures and consequently equal expansion characteristics under all conditions of heat to which the drum is subjected.

The provision of a separate L-shaped ring 13 cast into the head of a drum instead of casting a portion of the head 10 directly into the braking surface affords provision for a considerable contraction of the portion cast into the braking annulus without danger of these parts breaking apart incident to the contraction of the cast braking surface upon the cooling of the metal thereof after the casting operation. I therefore regard the arrangement whereby I first cast the ring 13 into the braking annulus and thereafter weld the composite ring and braking annulus to the backing plate as an important feature of my invention. In Fig. 3 I have illustrated a slightly modified form in which the backing plate is curved outwardly as indicated at 19 and press fitted within an annular cylindrical pressed metal ring 20. This form of my invention is otherwise identical with that of Figs. 1 and 2.

In Fig. 4 I have illustrated a still further modified form of my invention in which the edge of the head is unflanged and is welded directly to the L-shaped ring without being press fitted thereabout as illustrated at 21. In this form of my invention I have also illustrated a modified arrangement of ribs in which the central rib 22 of maximum height is disposed about two-thirds of the distance from the confined edge to the free edge of the braking annulus and a plurality of lesser ribs 23 are provided on each side of the rib 22. It will be noted that in this form as well as in the form previously described the ribbed braking annulus is more rigid in the neighborhood of its axial extremities than at any other point. This braking annulus is very rigid, and whatever expansion occurs will effect a concave curvature of the braking surface and the shoe may accordingly conform itself to this curvature upon the application of braking pressure thereto.

In connection with any of the above mentioned forms I have found it highly desirable to machine the exterior, as well as the interior surface of the drum to the desired finished size. This assures the desired thickness of successive axial components of the drum necessary to correctly correlate the heat dissipating and rigidity characteristics thereof and at the same time insures a uniformity of the drum annularly.

I have illustrated in the drawings three separate modifications of my invention. It will be obvious, however, that its generic spirit is broader than any of these specific modifications and I do not, accordingly, wish to be limited in the interpretation of my invention except in accordance with the broad generic spirit of the following claims.

What is claimed is:

1. A brake drum having an annular braking surface whose axial extremities the one anchored and the other free are sufficiently rigid to prevent any substantial distortion thereof and having a central axial zone more flexible than said end portions, the rigidity of the drum at its free end being substantially equal to the rigidity of the drum at its anchored end.

2. A brake drum comprising a cast braking ring, a second ring integrally secured to an axial extremity of said braking ring, and a head secured to said second ring.

3. A brake drum comprising a cast braking ring, a second ring secured to said braking ring adjacent an axial extremity thereof, and a head provided with a flange pressed fit about a portion of said second ring, said head being secured to said second ring.

4. A brake drum comprising a cast braking ring, a second ring secured to said braking ring adjacent an axial extremity thereof, and a head provided with a flange pressed fit within a portion of said second ring, said head being secured to said second ring.

5. A brake drum comprising a cast braking ring, an L-shaped ring having one of its arms integrally secured to said cast braking ring, and a head embracing said L-shaped ring and integrally secured thereto.

6. A brake drum comprising a cast braking ring, an L-shaped ring having one of its arms integrally secured to said cast braking ring, and a head embracing said L-shaped ring and integrally secured to a radially extending portion thereof.

7. A brake drum including a braking flange of substantial rigidity adjacent its opposite axial extremities and a more flexible portion intermediate said extremities, the opposite axial extremities being of substantially equal rigidity, and one extremity being radially flexibly anchored.

8. A brake drum comprising a cast braking ring, said ring having a cooling flange of substantial radial extent formed thereon substantially one-third of the axial extent of the brake portion of said ring from the free edge thereof, a second ring integrally secured to an axial extremity of said braking ring, and a head secured to said second ring.

9. A brake drum comprising a cast braking ring, said braking ring having cooling flanges, one of said flanges having substantial radial extent and being approximately one-third of the axial extent from the free edge of said ring and having additional cooling ring flanges of considerably shorter radial extent at either side thereof, an L-shaped ring having one of its arms integrally secured to said cast braking ring, and a head engaging a portion of said L-shaped ring and integrally secured thereto.

10. A brake drum of cast material having a predominating ribbing formed on its outer periphery and localized to a region approximately one-third of the distance from its free axial extremity to its head extremity, and a second ribbing of less predominance formed thereon in the neighborhood of the head extremity, the ribbing being located and proportioned to afford substantially equal rigidity and thermal expansion at its opposite extremities, whereby the braking loads in coaction with a usual T-section symmetrical brake shoe are substantially equally distributed on opposite sides of the central plane 11. A composite brake drum including a cast braking ring having a predominant ribbing integrally formed thereon and localized to a region approximately one-third of the distance from the free axial edge of the drum to the head thereof and a second predominating ribbing formed on said ring but of less predominance than the first named ribbing and localized to a region adjacent the zone of attachment of the head of the drum, the ribbing being located and proportioned to afford substantially equal rigidity at its opposite extremities, whereby the braking loads in coaction with the usual T-section symmetrical brake shoe are substantially equally distributed on opposite sides of the central plane passing through and normal to the axis of the drum.

12. A brake drum of cast material having a tall and thin outstandingly predominant rib adjacent but within its free axial extremity and a short and thick rib at the axially anchored extremity thereof into which is cast the head of the drum, the ribbing affording substantially equal rigidity and thermal expansion at the opposite extremities of the drum, whereby the braking loads in co-action with the usual T-section symmetrical brake shoe are substantially equally distributed on opposite sides of the central plane passing through and normal to the axis of the drum.

CAROLUS L. EKSERGIAN.